(12) United States Patent
Lord (10) Patent No.: US 8,773,589 B2
(45) Date of Patent: Jul. 8, 2014

(54) AUDIO/VIDEO METHODS AND SYSTEMS

(75) Inventor: John D. Lord, West Linn, OR (US)

(73) Assignee: Digimarc Corporation, Beaverton, OR (US)

(*) Notice: Subject to any disclaimer, the term of this patent is extended or adjusted under 35 U.S.C. 154(b) by 479 days.

(21) Appl. No.: 12/842,900

(22) Filed: Jul. 23, 2010

(65) Prior Publication Data

US 2011/0069229 A1 Mar. 24, 2011

Related U.S. Application Data

(60) Provisional application No. 61/228,336, filed on Jul. 24, 2009.

(51) Int. Cl.
*H04N 7/00* (2011.01)

(52) U.S. Cl.
USPC .......................................... 348/468

(58) Field of Classification Search
USPC .............. 713/2, 176, 150; 455/422.1, 556.1; 715/716; 726/26, 28; 348/169, 461
See application file for complete search history.

(56) References Cited

U.S. PATENT DOCUMENTS

| | | | |
|---|---|---|---|
| 6,005,610 A * | 12/1999 | Pingali | 348/169 |
| 6,148,271 A | 11/2000 | Marinelli | |
| 6,337,688 B1 * | 1/2002 | Berstis | 345/473 |
| 6,411,725 B1 | 6/2002 | Rhoads | |
| 6,987,975 B1 | 1/2006 | Irvin et al. | |
| 7,197,160 B2 | 3/2007 | Rhoads | |
| 7,370,190 B2 * | 5/2008 | Calhoon et al. | 713/2 |
| 8,131,145 B2 * | 3/2012 | Scheucher | 396/278 |
| 2002/0186233 A1 * | 12/2002 | Holtz et al. | 345/716 |
| 2003/0038892 A1 * | 2/2003 | Wang et al. | 348/461 |
| 2003/0122667 A1 * | 7/2003 | Flynn | 340/540 |
| 2003/0153351 A1 * | 8/2003 | Jung | 455/550 |

(Continued)

FOREIGN PATENT DOCUMENTS

| | | |
|---|---|---|
| EP | 2187595 | 5/2010 |
| WO | WO 2007/097271 | 8/2007 |
| WO | WO2011/011737 | 1/2011 |

OTHER PUBLICATIONS

International Search Report and Written Opinion of the International Searching Authority in PCT/US2010/043129 (corresponding to WO2011/011737), mailed Sep. 10, 2010.

(Continued)

*Primary Examiner* — Mohammad Islam
(74) *Attorney, Agent, or Firm* — Digimarc Corporation (57) ABSTRACT

Audio and or video data is structurally and persistently associated with auxiliary sensor data (e.g., relating to acceleration, orientation or tilt) through use of a unitary data object, such as a modified MPEG file or data stream. In this form, different rendering devices can employ co-conveyed sensor data to alter the audio or video content. Such use of the sensor data may be personalized to different users, e.g., through preference data. For example, accelerometer data can be associated with video data, allowing some users to view a shake-stabilized version of a video, and other users to view the video with such motion artifacts undisturbed. In like fashion, camera parameters, such as focal plane distance, can be co-conveyed with audio/video content—allowing the volume to be diminished (or not, again depending on user preference) when a camera captures audio/video from a distant subject. Some arrangements employ multiple image sensors and/or multiple audio sensors—each also collecting auxiliary data. A great number of other features and arrangements are also detailed.

9 Claims, 3 Drawing Sheets

(56) References Cited

U.S. PATENT DOCUMENTS

| | | |
|---|---|---|
| 2004/0091111 A1 | 5/2004 | Levy et al. |
| 2007/0067852 A1* | 3/2007 | James ............................ 726/28 |
| 2007/0192872 A1* | 8/2007 | Rhoads et al. .................. 726/26 |
| 2007/0204163 A1* | 8/2007 | Andrews et al. .............. 713/176 |
| 2008/0014917 A1* | 1/2008 | Rhoads et al. ............. 455/422.1 |
| 2009/0290645 A1 | 11/2009 | Mabey |

OTHER PUBLICATIONS

International Preliminary Report on Patentability in PCT/US2010/043129 (corresponding to WO2011/011737), mailed Feb. 2, 2012.

European Extended Search Report, Application 10802990.1 (corresponding to WO2011/011737), mailed Dec. 21, 2012.

* cited by examiner

AUDIO/VIDEO METHODS AND SYSTEMS

RELATED APPLICATION DATA

This application is a non-provisional of, and claims priority benefit to, provisional application 61/228,336, filed Jul. 24, 2009.

INTRODUCTION

For cell phones and other devices equipped with video/image sensors (e.g., cameras), it would be desirable if there were an encoding format that included additional streams of data beyond the image/sound of existing arrangements (e.g., MPEG) in a unitary fashion. Some of the extra data-streams that could be conveyed in such an arrangement include 2D/3D accelerometer/tilt, 2D/3D compass (magnetometer), lens zoom, aperture, focal distance, and depth of field, etc.

By conveying these data with the image information, the imagery can be processed conveniently in accordance with the auxiliary information. Moreover, if the auxiliary information is persistently associated with the image information, then different devices can use the auxiliary information to process the video (and/or audio) in different manners, at different times.

Such use of the auxiliary data can be by the device that captured the imagery, and/or by other devices/systems/applications (e.g., a video player application, or a social media website such as YouTube, etc.). Such processing can occur at the time of image capture (e.g., in manual or automated live production), or when video content is produced into an entertainment production, or during post-production (e.g., transcoding into different formats or for consumption in different environments), or when the content is ultimately rendered to a viewer, etc.

To illustrate, one embodiment of the present technology is a method in which both audio data and camera data (e.g., focal plane distance) are recovered from a unitary data object (e.g., an MPEG file or stream). The audio data is processed in accordance with the focal plane data to yield altered audio data for rendering to a user. This processing can comprise controlling the volume the audio so that sound captured when the focal plane corresponds to a distant subject is attenuated relative to when the focal plane corresponds to a nearby subject (i.e., the nearer subject sounds louder). This effect can be enabled, or disabled, by the user—depending on preference.

Another embodiment is a method in which both video data and sensor data (e.g., accelerometer data) is recovered from a unitary data object. The video data is processed in accordance with the accelerometer data to compensate—or not—for camera motion (e.g., shake), again based on preference data specified by a user.

More generally, certain aspects of the present technology involve unitary data objects that include both (1) audio and/or video information, and (2) camera and/or sensor data. Particular embodiments concern methods and apparatuses that create such unitary objects from different data sources, and/or that recover individual data from such unitary objects. Other methods and arrangements employ the sensor and/or camera data to alter the audio and/or video information.

The foregoing and other features and advantages of the present technology will be more readily apparent from the following detailed description, which proceeds with reference to the accompanying drawings.

DETAILED DESCRIPTION

Figure 1:
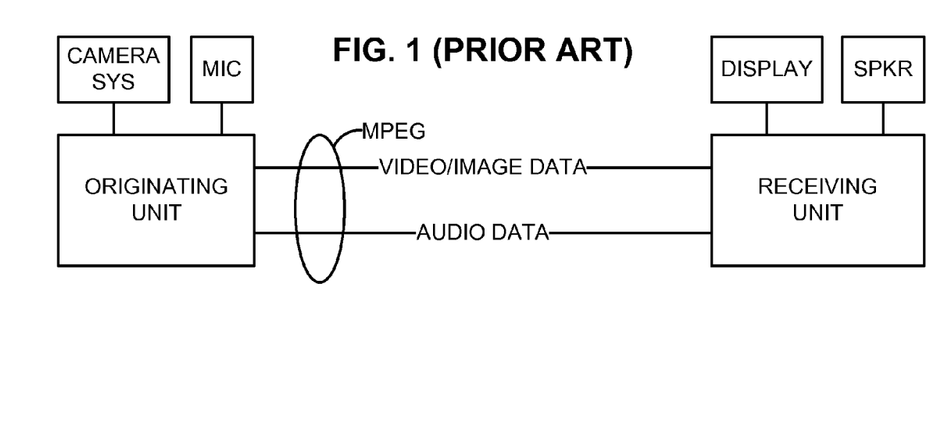
FIG. 1 shows a prior art arrangement in which audio and video data is conveyed between systems using MPEG encoding.

FIG. 1 shows a prior art arrangement. An originating device, such as a video camera, includes a camera system (including a 2D image sensor) for capturing imagery, and a microphone for capturing audio. The captured data is described (e.g., encoded) per a standard such as MPEG. The resulting video and audio data streams are integrated in a well understood fashion (e.g., an MPEG data stream)—compatible with all manner of other processing and recording devices. A receiving unit decodes the transmitted video and provides it to a display screen. Likewise, the receiving unit decodes the transmitted audio, and provides it to a speaker Newer devices include a great number of sensors beyond the prior art image sensor/microphone. For example, even inexpensive smart phones include components such as accelerometers (to sense gestures, tilt, etc.), and magnetometers (e.g., to sense compass direction). Additionally, optical capture parameters—such as lens zoom and aperture size—can be taken as data, and used in later processing of the image (and/or audio) data.

Figure 2:
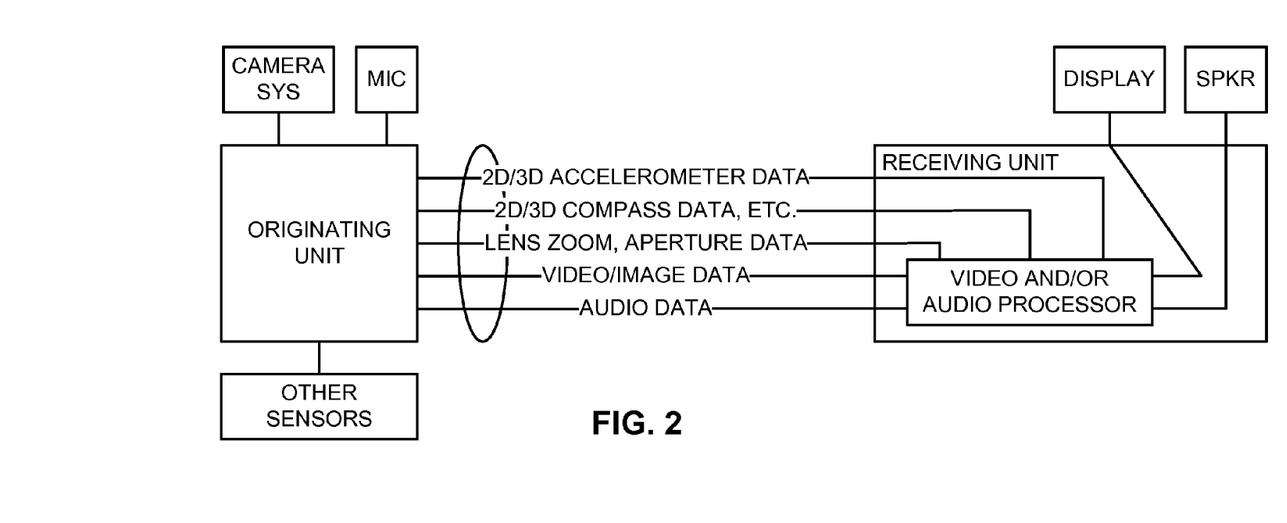
FIG. 2 shows an arrangement according to one aspect of the present technology.

FIG. 2 shows an exemplary implementation using aspects of the present technology. The originating unit (e.g., a cell phone) provides data including 3 dimensions of acceleration information, (typically three MEMS accelerometers in orthogonal arrangement), 3D location coordinates (e.g., by GPS or otherwise), time stamp data, three dimensions of orientation information (typically derived from a magnetometer or Hall-effect compass), and tilt sensors (which may comprise integrated accelerometer data, or gyroscopic devices). Camera data can include information regarding focus, zoom, aperture size, depth-of-field, exposure time, ISO setting, lens focal-length, focal depth, etc. Such parameters allow re-computation of how the image is related to the spatial domain. Other system specific timing information can be included, such as relative lag between each of the transducers and the camera/video frames. The auxiliary data can include a frame identification number of an associated video frame, or other synchronization method tied with MPEG I-frames, for example.

This just-detailed information is co-conveyed with audio and/or video information captured by the originating unit, e.g., in a unitary data stream such as MPEG, or stored in a unitary file, such as an MPEG data file. (Such unitary arrangements are collectively referred to as unitary data objects, and have the benefit of persistently associating these disparate types of data together in a structured fashion.)

Also shown in FIG. 2 is a receiving unit. The receiving unit takes some or all of the data just-detailed, and employs it in fashioning an output rendered to a user.

Consider a few examples of how such an output might relate to the co-conveyed auxiliary data. One is shake compensation (motion stabilization). Many cameras sense shaking of the camera (e.g., by one or more accelerometers), and process the image data to remove this effect before it is output from the camera. An arrangement employing the present technology senses the shaking—as before. However, rather than removing this effect in the camera, the associated shaking data is conveyed with the captured image data. Devices and applications that receive this data may elect to apply an anti-shake algorithm (of the sort used in prior art cameras), or they can present the imagery in its raw, pristine form, including the shake. Whether to apply the auxiliary data to remove the shaking artifacts can be decided on a case by case basis, either automatically (e.g., a particular video player may always present video in shake-stabilized fashion) or in accordance with user choice (e.g., as indicated by operation of a user interface control, or by reference to stored preference data).

Another example is audio processing. Most audio capture devices include some form of automatic gain control (AGC) that seeks to keep a relatively constant audio level. If the audio sensed by the microphone is weak, it is amplified; if it is strong, it is attenuated. This is generally desirable, e.g., for listener comfort. In accordance with an aspect of the present technology, AGC is applied at the time of capture, as before. However, at the time of rendering, an application may control the volume of the audio in accordance with the distance of the subject from the camera. That is, the audio output can be controlled in accordance with auxiliary data indicating the position of the camera's focal plane. If the camera is focused on a subject close to the camera (e.g., an interview with a person a few feet away), then the rendering system can output the audio level at a first value. In contrast, if the camera is focused on a distant subject, then the rendering device can reduce the audio level, to a lower, second value—giving the audience an acoustic effect that reinforces the distant visual effect. This is termed "dimensional" audio herein. (Again, whether or not such processing is employed can be selectively controlled, automatically or manually.)

Similarly, sound effects may be added, or tailored, based on motion of the camera—as indicated by co-conveyed accelerometer or magnetometer data. If camera shake or jitter is sensed, a low frequency rumble can be overlaid on the existing audio data. If data indicates the camera is panning up or down, a whistle of ascending or descending frequency (respectively) can be added. Etc.

Figure 3:
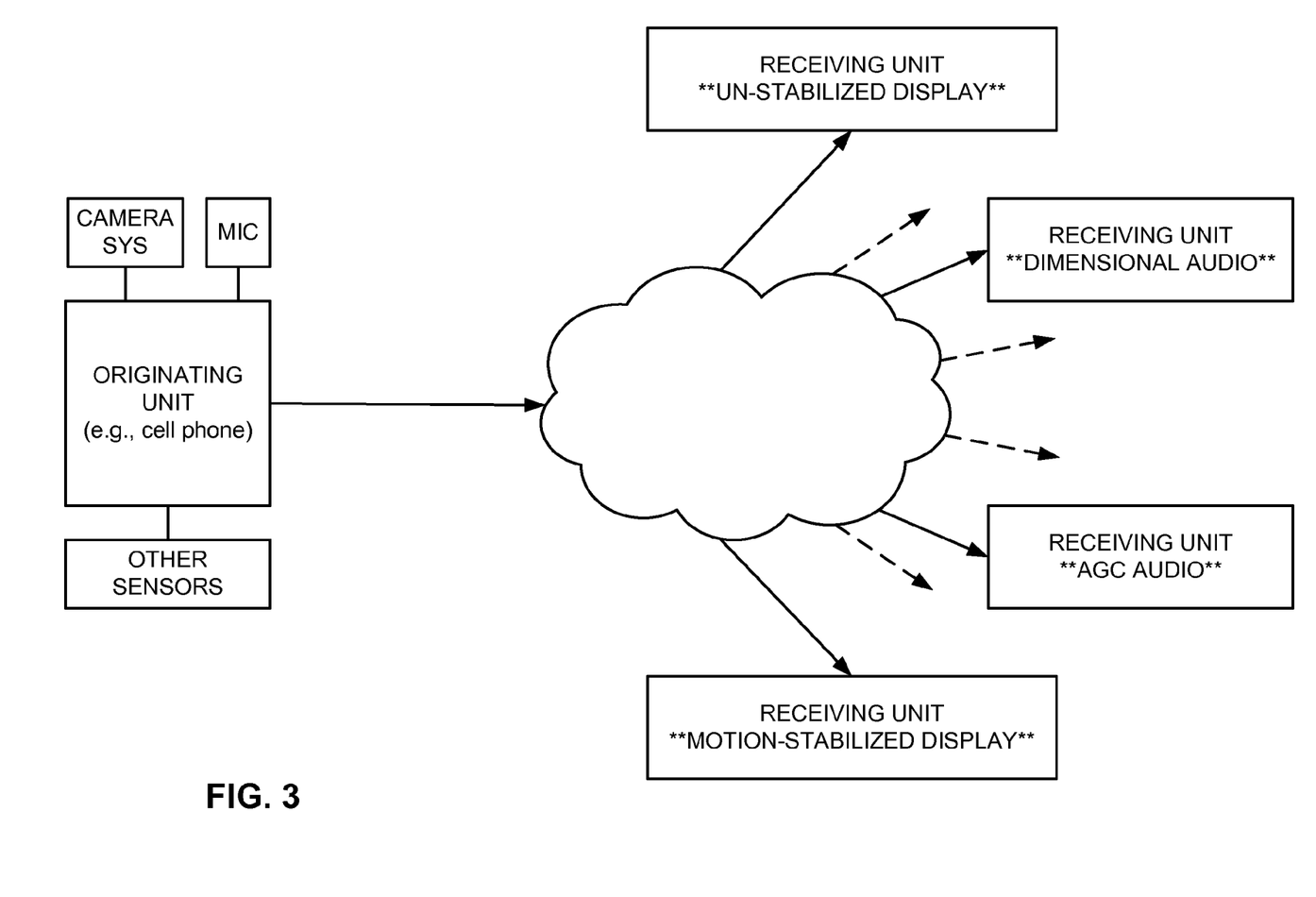
FIG. 3 shows how different receiving units can make use of a common data stream originated from a mobile phone.
Figure 4:
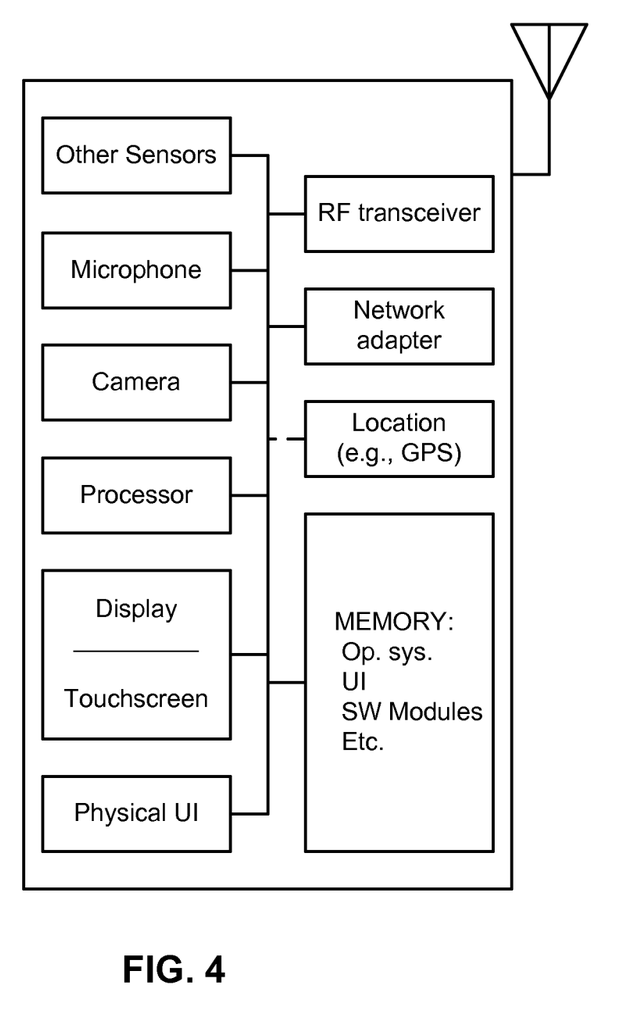
FIG. 4 is a block diagram showing aspects of a mobile phone.

FIG. 3 depicts the versatility of this arrangement. A single data feed is output from the originating unit. This data feed is distributed to a variety of receiving units—either "live," or via intermediate storage and/or production. Different of the receiving units render the data differently, e.g., some with motion-stabilized display, some without; some with dimensional audio, some with conventional (AGC) audio. (The receiving units may also be cell phones. One of the receiving units may be the originating unit. A block diagram of an exemplary cell phone is shown in FIG. 4.)

While the receiving unit in FIG. 2 is shown as including only a display and a speaker for output devices, more or less output devices can of course be used. In one arrangement, one or more haptic output devices is included, e.g., so that motion information sensed at the originating unit can be rendered as motion (vibration) at the receiving unit. Haptic technology and output devices are known from the patents of Immersion Corp., such as U.S. Pat. Nos. 7,425,675, 7,561,142 and published application 20090096632.

The encoding of the disparate data streams can use the basic approach of known protocols such as MPEG-2/H.262 and H.264/MPG-4. These protocols can be amended to add other extensions, similar to the (audio) MPG Multichannel (ISO 14496-3). Another approach is to use one or more of the channels available among the 6 LCPM audio channels in MPEG-2 (these are losslessly encoded and can be done at lower sample- and bit-rates).

To illustrate, data for each of the spatial transducers, transducer axes, camera settings, optical parameters, etc., are encoded into a digital stream and inserted into one of the audio channels of an MPEG-2 stream at the time of its encoding. (Current encoding allows selection of the number of channels and bitrates, so one or more channels can be made available for use.) An audio encoding method is chosen where a sufficient number additional channels is implemented beyond the number required for the original audio from the camera and microphone(s). The transducer, etc., data comprises the data-stream for these additional audio channel(s). This keeps the transducer data synchronized with the audio/video stream, which is desirable for subsequent processing of the audio/video data. (In another arrangement, synchronization is not maintained in the protocol, but established later by reference to synchronization signals digitally watermarked into one or more of the auxiliary data streams, together with the audio and/or video data. See, e.g., U.S. Pat. Nos. 6,836, 295 and 6,785,401.)

Since spatial and accelerometer data doesn't need a very high bit-rate (as further discussed below) these data streams can be combined serially into a lesser number of audio channels (even a single audio channel). As a rough example: allowing 32-bits per sample for each of 3 axes for 4 transducers (12 in all), plus 32 camera settings of 32-bit each, yields a total of 176 bytes per one image frame. If the image frame rate is 60 frames/sec, the auxiliary data rate is 10,560 bytes/sec, which is well inside even the lowest audio channel (44.1 kHz @ 8-bit). Since some auxiliary data does not need transmission with every frame, channel use can be reduced still further.

Because of their lower data rates, the auxiliary data can be encoded at lower bit rates than conventional audio. Spatial coordinates of the camera may have the lowest rate. Auxiliary data characterizing the optical capture system (lens, optics, exposure, etc) may be transmitted routinely, but only need be transmitted when changed (usually in association with the frame in which the change is first manifested). In one particular implementation, such data is sent aligned with I-frames of MPEG video for image post-processing in edited streams. Zoom, aperture, orientation, depth of field, focal distance, bearing, 3D GPS, time, and others, are only required once per frame. Acceleration information is usefully collected at a faster rate to retain camera motion-in-space (or integrated to derive velocity and relative spatial position). It can be collected more rapidly than once per frame, but transmitted only at frame intervals, or it can be transmitted more or less frequently. (That is, accelerometer and position data need not be restricted to the video frame rate.)

Given the relatively low data rates, data compression is not required (but of course, may be used). For the slow-changing data, some implementations may usually transmit differential updates, and less frequently transmit full co-ordinates for re-synchronization (in a manner akin to I versus B and P frames in MPEG). The different data types (e.g., differential or full) can be indicated by tags (e.g., in XML style) in associated data packets or fields.

Acceleration data can be integrated (first and second order integrals) locally at the originating unit, and these parameters included in the auxiliary data stream, since higher precision may be achieved than needed to locate each frame. Similarly, spatial positioning may be better computed at higher precision on the camera by tracking and combining acceleration, orientation, compass, and location. Integration of acceleration data effectively cuts its bandwidth.

In some embodiments the auxiliary data is grouped into a stream with synchronization and identification fields/tags, to enable parsing and correlation to the video. The precision of the different data can also be specified (tagged) in the stream.

In another arrangement, each sample group of spatial information is delimited or formed into a packet, with a timestamp corresponding to that data.

In one particular arrangement, the auxiliary data is encoded and multiplexed between and/or mixed into existing audio channels, e.g., in 5.1 audio implementations. For monaural sound, such as from mobile phones and many other cameras, the extra channel capacity is essentially free to exploit. In another implementation, the auxiliary data is encoded in one or more carriers near the bottom or top of the human audio range, e.g., below 300 Hz or above 15 KHz. (MP3 or other encoding can be tailored to preserve such data bands.) These data bands can optionally be filtered and removed in audio rendered for human consumption, at the time of playback.

In still another arrangement, the auxiliary data is conveyed steganographically, as subtle changes to the audio (or video) throughout part or all of the audio (video) range. Such digital watermarking technologies are detailed, e.g., in U.S. Pat. Nos. 6,061,793 and 6,590,996.

As is evident to the artisan, a decoder arrangement complementary to the encoding arrangement is provided to extract the auxiliary data, e.g., at the receiving unit(s).

Still another arrangement employs a new standard encoding format, where the transducer and camera data are encoded within a dedicated channel, which is synchronized with the video frame encoding (although, again, it need not be restricted to the frame rate).

The data field tags and/or packet header fields within the stream can be made extensible to allow for the inclusion of additional data types in the future. In one particular arrangement, the packet header is kept short—serving simply to identify a few standard groups/packets of transducer data; whether the group is a relative or absolute coordinate group; and/or whether it contains camera info or not. A number of additional header bit combinations are optionally reserved for packets using extensible content. Each data element or group within the (extensible) packet can then be delimited, sequentially or hierarchically (as in XML). Extensibility may be useful for all data groups, but desirably doesn't form a dominant part of the bandwidth requirement.

The encoded stream (or corresponding file structure) desirably is tagged near the start to enable players that are aware of the protocol to enable correct parsing options, choose to ignore the stream, not try to play the auxiliary data as sound (if encoded in an audio channel), etc.

For playback on legacy devices (e.g., legacy video/audio players), the auxiliary data can be stripped out in advance, or if the player is aware of the encoding protocol it can choose to ignore the data.

A few examples illustrating use of the co-conveyed auxiliary data were given above. The number of such applications is myriad. A few other examples are noted briefly below:

Combine with spatial information from mapping, (e.g. similar to the augmented reality system Layar.eu, but working from recorded video instead of a live feed).

Build 3D images (even using camera motion and shake in conjunction with optical path settings to provide stereoscopic view information, then interpolate images).

Track camera spatial position for mapping.

User-tagging of image content for location or social applications.

Enable post-production or live playback tagging of objects in the field of view (e.g. previously recorded video clip of a vacation now can indicate where friends are in real time, while visiting the same place, via their real-time coordinate feed from cell-phones).

Allow search of video for possible views of events (forensic applications for crime, etc—did anyone happen to capture a view of event X in background with a quick search rather than manual re-viewing & discerning what each frame's view is of).

The combined audio/video and auxiliary data stream can be used in a live broadcast, or recorded. When live, it allows an originating unit to capture an event (e.g., a sports event), with processing of the auxiliary data (e.g., processing of the audio/video in conjunction with the auxiliary data) performed either by the viewer (home on PC/TV) or by an intermediate service (broadcast studio or cloud processing).

Multiple camera views can be combined to build a more complex spatial view. A viewer can then observe an event with post-processing effects enabled to view from different angles. With spatial tag data attached, or through use of object recognition, an observer/viewer can track an individual player, athlete, car, horse, where the multiple image sources with spatial data included in the stream are selected/interpolated/blended to follow the marked object/person. Additional markers and tags can be inserted into the scene at specific spatial locations.

Location (GPS)/acceleration monitoring tags can be made for various sports events, including car, horse, football (e.g., built into player uniforms). Auxiliary data transponders (position, acceleration, etc.) can even be integrated into sports balls, pucks, or other moving or static fixtures, and such auxiliary data co-conveyed with audio/video of the event (e.g., taken from the sidelines). These give objects being viewed known locations relative to the camera.

Other Comments

The reader is presumed familiar with the various protocols and data transmission standards/specifications relevant to the discussions above. The various standards documents detailing such specifications (e.g., ISO/IEC 14496-3, ISO/IEC 13818-1, ISO/IEC 14496, ITU H.262, ITU H.222, RFC 3640, etc.) are incorporated herein by reference.

Having described and illustrated the principles of the inventive work with reference to illustrative examples, it will be recognized that the technology is not so limited.

For example, while reference was particularly made to exemplary protocols and standards (e.g., MPEG-2), others can naturally be adapted for the purposes detailed. These include MPEG-4, MPEG-7, MPEG-21, etc.

Reference was made to an embodiment in which audio is AGC-processed at the time of capture, and the audio level is thereafter controllably varied in accordance with auxiliary data. In another arrangement, the audio is not AGC-processed at the time of capture. Instead, it is encoded in its originally captured form. The audio level, or other effects, can still be controlled in accordance with the auxiliary data.

Although the detailed embodiments use the auxiliary data in processing co-conveyed audio and/or video data, this is not essential. In other implementations the auxiliary data can be used by the receiving unit for a purpose independent of the audio/video (e.g., identifying the capture location on a displayed map, etc.).

It will be recognized that, instead of encoding the sensor data (or camera data) itself, other information based on such data can be encoded. For example, data indicating instantaneous location information can be processed, on the cell phone, to yield motion vector data. This motion vector data (and other such post-processed data) can be encoded in a unitary data object together with associated audio and/or video. While motion is related to position by a derivative process, myriad other types of processing can also be applied, e.g., integration, filtering, etc., etc. Similarly, different types of auxiliary data can be combined or otherwise jointly processed (e.g., a derivative of the location data can produce one estimate of motion, and an integration of accelerometer data can produce a second estimate of motion, and these two estimates can then be averaged). In some arrangements, the original sensor data is stored, and a tag to this original data is included in the encoded data stream for subsequent re-analysis, if/when required.

Similarly, it should be understood that the detailed types of auxiliary data are illustrative—not limiting. For example, in another arrangement, an athlete's smart phone may be equipped with an oxygen sensor, or a heart rate monitor, and this information may be stored in a data structure that also includes related audio or video information. (In some embodiments, such sensors may be coupled to the phone by Bluetooth or other short range coupling technology.) By such arrangement, a bicycle race video may be rendered with graphical annotations showing the varying heart rates and blood oxygen levels of the competitors.

While the detailed arrangements particularly considered that the auxiliary (e.g., sensor) data can usefully contribute to processing the image (video) data, other processing arrangements are also useful. For example, the image data can be used to help process the sensor data, or to provide synchronization between imagery and sets of sensor data. A video stream may include data synchronization tags inserted into the data channel, to which much larger or alternative data can be synchronized. (These may need to be different than video frame/time stamps, since it may not be possible to calculate the event ID of a sensor measurement from the frame number or time. Also, video post-production could lose the original frame information.) Likewise, if the captured auxiliary data is too large to be conveniently included within the unitary data object (e.g., in an audio or metadata channel), then an ID number associated with this data can be inserted into the unitary data object instead.

Consider, for example, capturing a still photo, and transducer data, at some time during capture of motion video. A tag for the image can be inserted into a video stream auxiliary channel to link to the picture. (The picture can have a tag to link back to the video frame/time.) The photo capture time may be recorded at a finer resolution than the frame rate.

Consider, too, collecting a high-speed sample sequence of positional data for a smart phone (e.g., location, orientation, tilt) —at a frame rate greater than a video frame rate, as the phone is capturing video. The resulting auxiliary data may be too voluminous to be included in a data object with the video. (Or the positional data may be captured in a different process.) An ID for this positional data is given a tag, and the tag is inserted into the video stream (perhaps at the start- and stop-point for this data capture). This data can be processed to various ends, e.g., synthesizing 3D models of imaged subjects, quantifying user motions associated with holding/using the phone, etc.

While the detailed arrangement particularly considered a single image sensor, or a single audio sensor, the technology is also well suited for use with multiple sensors.

In one such arrangement, multiple sensors capture audio or video, and/or auxiliary data. The captured information can be fed to a cloud resource, or other processing system, where these multiple streams can be analyzed, combined, or selected-between for rendering. For example, relative locations of plural cameras can be calculated from associated positional data (e.g., encoded with the video). When one camera is within the view of another, its presence or positioned may be indicated in a UI (e.g., by a highlighting rectangle in a viewing frame) —indicating to the viewer that another view point is available. When video journalists capture events, or interviews, spatial location information can indicate where better audio or pictures may be available in a different video stream than one being viewed.

Multiple viewpoints of an event can be analyzed and combined to render a 3D model of an event. Captured position (motion) data allows camera motion to be compensated-for, and for each image to be transformed/re-mapped based on camera orientation, focal length, field of view, etc.

If multiple audio sensors are deployed in a space—each also collecting auxiliary information (e.g., their instantaneous positions), a rich data set results from which various effects can be generated. Consider filming a motion picture in which each performer has such a microphone. The resulting audio/auxiliary data streams can be rendered in different fashions to different consumers. One consumer may want to hear the audio as if in the center of the action. (E.g., a positional average of the microphones can be computed, and the sound field contribution at that location from each of the respective microphones can be computed and rendered, optionally with stereo directionality modeled based on known models of human binaural hearing.) Another consumer may want to follow a particular actress, and hear the audio as she would have heard it. Again, such a system can determine the net sound field at the location of the actress, as she moves around. (The actress's voice is always primary; others are audible in accordance with their distance from the actress.) If the rendering environment includes an array of speakers, e.g., right front, left front, back center (e.g., multi-channel surround sound), then the data can be processed to take into account not just volume, but also 360 degrees of directionality, when rendered to the consumer. The consumer can pick essentially any virtual listening point in the original performance—static or moving.

In still another embodiment, the location of the consumer can be sensed (e.g., using a carried smartphone), and the audio sources can be rendered by a processor (e.g., the consumer's smartphone) in accordance with the consumer's position and movement. For example, in audio rendering of a cocktail party (recorded using the arrangement of the previous paragraph), the consumer can move within a physical space to eavesdrop on conversations of particular interest. This can be done without multi-channel surround sound (e.g., with simple earbuds plugged into the consumer's smartphone), or multi-channel speaker arrangements can be employed.

The just-noted arrangement has particular applicability in computer-based games, where a player can interact with the system—or other real/virtual players—both in time and location.

The assignee's U.S. Pat. No. 7,197,160 details how positional information (e.g., latitude/longitude) can be steganographically encoded into imagery and audio.

While reference has been made to cell phones, it will be recognized that this technology finds utility with all manner of devices—phones and not, both portable and fixed.

(Among particularly contemplated cell phones are the Apple iPhone 4, and cell phones following Google's Android specification, e.g., the HTC Evo 4G and the Motorola Droid X. Details of the iPhone, including its touch interface, are provided in Apple's published patent application 20080174570.)

The basic design of cell phones and other devices that can serve as the originating and receiving units are familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, and software instructions for providing a graphical user interface), interconnections between these elements (e.g., buses), and an interface for communicating with other devices (which may be wireless, such as GSM, CDMA, W-CDMA, CDMA2000, TDMA, EV-DO, HSDPA, WiFi, WiMax, or Bluetooth, and/or wired, such as through an Ethernet local area network, a T-1 internet connection, etc). Originating devices typically include a camera and/or a microphone, together with one or more other components/systems for providing the auxiliary data noted above.

Software instructions for implementing the detailed functionality can be readily authored by artisans, from the descriptions provided herein, e.g., written in C, C++, Visual Basic, Java, Python, Tcl, Perl, Scheme, Ruby, etc. Cell phones and other devices according to the present technology can include software modules for performing the different functions and acts.

Commonly, each device includes operating system software that provides interfaces to hardware resources and general purpose functions, and also includes application software which can be selectively invoked to perform particular tasks desired by a user. Known audio and video codecs, browser software, communications software, and media processing software can be adapted for many of the uses detailed herein. Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

Different of the functionality can be implemented on different devices. Description of an operation as being performed by a particular device (e.g., an originating cell phone encoding lens data into an audio channel of an MPEG stream) is not limiting but exemplary; performance of the operation by another device (e.g., a subsequent device that receives, or knows, the lens data apart from the MPEG stream) is also expressly contemplated.

(In like fashion, description of data being stored on a particular device is also exemplary; data can be stored anywhere: local device, remote device, in the cloud, distributed, etc.)

Operations need not be performed exclusively by specifically-identifiable hardware. Rather, some operations can be referred out to other services (e.g., cloud computing), which attend to their execution by still further, generally anonymous, systems. Such distributed systems can be large scale (e.g., involving computing resources around the globe), or local (e.g., as when a portable device identifies nearby devices through Bluetooth communication, and involves one or more of the nearby devices in a task—such as contributing data from a local geography.)

While this disclosure has detailed particular orderings of acts and particular combinations of elements in the illustrative embodiments, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated.

It will be recognized that the detailed processing of content signals (e.g., image signals, audio signals, transducer signals, etc.) includes the transformation of these signals in various physical forms. Images and video (forms of electromagnetic waves traveling through physical space and depicting physical objects) may be captured from physical objects using cameras or other capture equipment, or generated by a computing device. Similarly, audio pressure waves traveling through a physical medium may be captured using an audio transducer (e.g., microphone) and converted to an electronic signal (digital or analog form). While these signals are typically processed in electronic and digital form to implement the components and processes described above, they may also be captured, processed, transferred and stored in other physical forms, including electronic, optical, magnetic and electromagnetic wave forms. The content signals are transformed in various ways and for various purposes during processing, producing various data structure representations of the signals and related information. In turn, the data structure signals in memory are transformed for manipulation during searching, sorting, reading, writing and retrieval. The signals are also transformed for capture, transfer, storage, and output via display or audio transducer (e.g., speakers).

The features and arrangements detailed in this specification can be used on conjunction with the features and arrangements detailed in copending application Ser. No. 12/484,115, filed Jun. 12, 2009 (published as US20100048242). For example, the object recognition architectures and technologies detailed in application Ser. No. 12/484,115 can be used in implementations of the present technology. It should be understood that the methods, elements and concepts disclosed in the present application are intended to be combined with the methods, elements and concepts detailed in the '115 application (and vice versa). Implementation of all such combinations is straightforward to the artisan from the provided teachings.

In certain embodiments, the originating device captures biometric information from one or more persons (e.g., fingerprint, heart rate, retinal pattern, respiration rate, etc.). This data can again be used by the receiving unit, e.g., in determining how (whether) the audio/video data should be rendered.

The detailed technology is particularly useful with User Generated Content (UGC) sites, such as YouTube. The auxiliary data detailed herein can be received and stored by the UGC site, and later be provided to other users—for them to use in the manners described. Alternatively, the UGC site can employ the auxiliary data to process the audio/video data, and then provide only the processed audio/video data to users. (That is, the illustrated "receiving unit" of FIG. 2 may, in fact, be an intermediate processing unit, which provides audio and/or video to still further units.)

Repeated reference was made to GPS data. This should be understood as a short-hand for any location-related information; it need not be derived from the Global Positioning System constellation of satellites. For example, another technology that is suitable for generating location data relies on radio signals that are that commonly exchanged between devices (e.g., WiFi, cellular, etc.). Given several communicating devices, the signals themselves—and the imperfect digital clock signals that control them—form a reference system from which both highly accurate time and position can be abstracted. Such technology is detailed in laid-open international patent publication WO08/073,347. The artisan will be familiar with several other location-estimating techniques, including those based on time of arrival techniques, and those based on locations of broadcast radio and television towers (as offered by Rosum) and WiFi nodes (as offered by Skyhook Wireless, and employed in the iPhone), etc.

While position information commonly comprises latitude and longitude data, it may alternatively comprise more, less, or different data. For example, it may include orientation information, such as compass direction provided by a magnetometer, or inclination information provided by gyroscopic or other sensors. It may also include elevation information, such as provided by digital altimeter systems.

Digimarc has various other patent documents relevant to the present subject matter. See, e.g., application Ser. No. 12/835,527, filed Jul. 13, 2010, published international application WO2010022185, and U.S. Pat. No. 6,947,571.

It is impossible to expressly catalog the myriad variations and combinations of the technology described herein. Applicant recognizes and intends that the concepts of this specification can be combined, substituted and interchanged—both among and between themselves, as well as with those known from the cited prior art. Moreover, it will be recognized that the detailed technology can be included with other technologies—current and upcoming—to advantageous effect.

To provide a comprehensive disclosure without unduly lengthening this specification, applicant incorporates-by-reference the documents and patent disclosures referenced above. (Such documents are incorporated in their entireties, even if cited above in connection with specific of their teachings.) These references disclose technologies and teachings that can be incorporated into the arrangements detailed herein, and into which the technologies and teachings detailed herein can be incorporated.

I claim:

1. A method comprising the acts:
obtaining preference data from a user, about shake-compensation, through a user interface; receiving a unitary data object comprising video data that has been previously edited; recovering both video data and sensor data from the unitary data object, the sensor data comprising a parameter relating to acceleration, orientation and tilt; and processing the video data in accordance with the sensor data, in accordance with the user preference data, to yield altered video data for rendering to a user, said processing comprising shake-compensating the video; and
rendering the shake-compensated video to a user; wherein at least one of said acts is performed by a hardware processor.

2. A non-transitory computer readable medium containing software instructions for configuring a hardware processing system to perform acts including:
obtaining preference data from a user, about shake-compensation, through a user interface; receiving a unitary data object comprising video data that has been previously edited; recovering both video data and sensor data from the unitary data object, the sensor data comprising a parameter relating to acceleration, orientation and tilt;
processing the video data with the sensor data, in accordance with the user preference data, to yield altered video data for rendering to a user, said processing comprising shake-compensating the video; and rendering the shake-compensated video to a user.

3. A system including at least one processor and memory, the memory containing instructions configuring the system to perform acts including: obtaining preference data from a user, about shake-compensation, through a user interface; receiving a unitary data object comprising video data that has been previously edited; recovering both video data and sensor data from the unitary data object, the sensor data comprising a parameter relating to acceleration, orientation and tilt;
processing the video data with the sensor data, in accordance with the user preference data, to yield altered video data for rendering to a user, said processing comprising shake-compensating the video; and rendering the shake-compensated video to a user.

4. The method of claim 1 in which the unitary data object also comprises audio data, and said act of recovering sensor data from the unitary data object comprises applying a steganographic decoding process to the audio data to extract the sensor data therefrom.

5. The method of claim 1 in which the sensor data comprises a parameter relating to acceleration.

6. The non-transitory computer readable medium of claim 2 in which the unitary data object also comprises audio data, and in which the software instructions for configuring the hardware processing system to recover sensor data from the unitary data object comprise software instructions for applying a steganographic decoding process to the audio data to extract the sensor data therefrom.

7. The non-transitory computer readable medium of claim 2 in which said sensor data comprises a parameter relating to acceleration.

8. The system of claim 3 in which the unitary data object also comprises audio data, and in which said instructions configuring the system to recover sensor data from the unitary data object comprise instructions for applying a steganographic decoding process to the audio data to extract the sensor data therefrom.

9. The system of claim 3 in which the sensor data comprises a parameter relating to acceleration.

* * * * *